J. STELMACH.
ROUTING CUTTER.
APPLICATION FILED APR. 11, 1919.
1,359,765.
Patented Nov. 23, 1920.
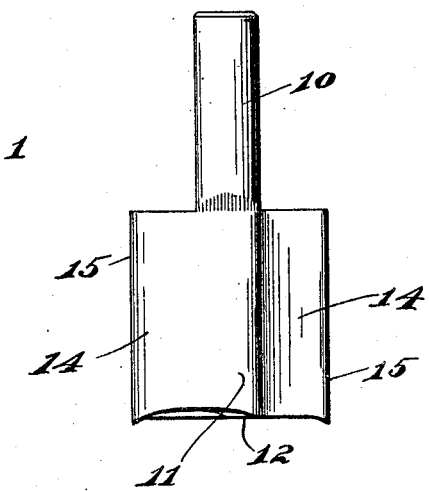
Fig. 1
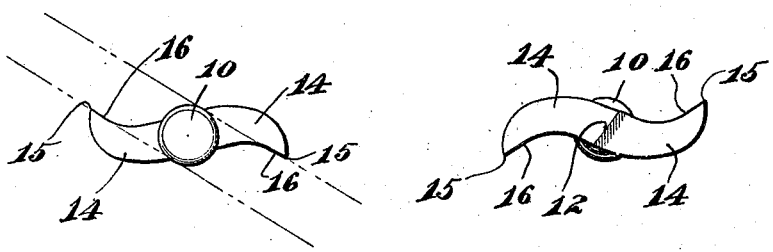
Fig. 2.
Fig. 3.
INVENTOR
Joseph Stelmach
BY
ATTORNEY

UNITED STATES PATENT OFFICE.

JOSEPH STELMACH, OF TROY, NEW YORK.

ROUTING-CUTTER.

1,359,765.  Specification of Letters Patent.  Patented Nov. 23, 1920.

Application filed April 11, 1919. Serial No. 289,381.

*To all whom it may concern:*

Be it known that I, JOSEPH STELMACH, a citizen of Poland, residing at Troy, county of Rensselaer, and State of New York, have invented certain new and useful Improvements in Routing-Cutters, of which the following is a specification.

This invention relates to improvements in cutters as used for woodworking machines, and the principal object of this invention is to provide a cutter which will operate in such manner as to form a relatively smooth surface, the cutter being adapted to be forced into the wood without previous opening made therein.

A further object is to arrange the cutting edges of the cutter tangent to the stem, so that they may be sharpened by reducing the tangential sides, as by grinding without material altering the operative length.

These and other like objects are attained by the novel construction and combination of parts hereinafter described, and shown in the accompanying drawings, forming a material part of this disclosure, and in which:—

Figure 1 is a side elevational view showing a routing cutter made in accordance with the invention.

Fig. 2 is a top plan view of the same, and Fig. 3 is a bottom plan view thereof.

A solid cylindrical stem 10, is fitted to the collet or chuck of the machine and held therein by the usual device. Integrally formed with the stem or shank 10, is a body portion 11, so ground as to present at its bottom a relatively narrow cutting edge 12, adapted to be forced into the wood, while extending from the central body are two wing elements 14, the same being oppositely disposed and having curved exterior profiles terminating in straight vertical cutting edges 15, their flat front faces 16 being arranged tangentially to the stem or shank 10, as can best be seen in Fig. 2.

The tangential surfaces are formed in parallel and permit grinding so as to maintain the cutting edges 15 in a properly sharpened condition, without materially affecting their shape or distance apart.

It has been found by experience that cutters made in the manner indicated are capable of producing superior work, that is to say, the finished interior surface, as formed by the routing cutter, is smoother than ordinary, while the power required to rotate the cutter is considerably less than usual.

Having thus described my invention what I claim as new and desire to secure by Letters Patent, is:—

A routing cutter comprising a shank, a body formed therewith, said body being substantially flat, and having curved outer surfaces and flat inner surfaces, said flat inner surfaces being formed at a tangent with said shank, means at the bottom of said cutter for advancing into the material operated upon, and cutting edges formed with extremities of said body adapted to be ground upon their flat sides, whereby the operative diameter of said cutter remains unchanged.

In testimony whereof I have affixed my signature.

JOSEPH STELMACH.